US008325015B2

(12) United States Patent
Hall

(10) Patent No.: US 8,325,015 B2
(45) Date of Patent: Dec. 4, 2012

(54) CONDUCTIVE SILICONE WRISTBAND FOR WIRELESS COMMUNICATIONS

(75) Inventor: Trevor G. R. Hall, Twickenham (GB)

(73) Assignee: NXP B.V., Eindhoven (NL)

( * ) Notice: Subject to any disclaimer, the term of this patent is extended or adjusted under 35 U.S.C. 154(b) by 407 days.

(21) Appl. No.: 12/812,586

(22) PCT Filed: Jan. 17, 2009

(86) PCT No.: PCT/IB2009/050165
§ 371 (c)(1), (2), (4) Date: Jul. 12, 2010

(87) PCT Pub. No.: WO2009/090619
PCT Pub. Date: Jul. 23, 2009

(65) Prior Publication Data

US 2010/0289622 A1 Nov. 18, 2010

Related U.S. Application Data

(60) Provisional application No. 61/022,006, filed on Jan. 18, 2008.

(51) Int. Cl.
*H04Q 5/22* (2006.01)

(52) U.S. Cl. ........................ 340/10.1; 343/718; 343/728

(58) Field of Classification Search ................. 340/10.1; 343/700 R, 718, 728
See application file for complete search history.

(56) References Cited

U.S. PATENT DOCUMENTS

| | | | | |
|---|---|---|---|---|
| 5,168,281 | A * | 12/1992 | Tokunaga | 343/718 |
| 5,280,645 | A * | 1/1994 | Nguyen et al. | 455/274 |
| 5,450,091 | A * | 9/1995 | Hama | 343/718 |
| 5,465,098 | A * | 11/1995 | Fujisawa et al. | 343/718 |
| 5,526,006 | A * | 6/1996 | Akahane et al. | 343/718 |
| 5,742,256 | A * | 4/1998 | Wakabayashi | 343/718 |
| 5,986,566 | A * | 11/1999 | Yamamori | 340/7.63 |
| 6,366,250 | B1 * | 4/2002 | McConnell | 343/718 |
| 2004/0171287 | A1 | 9/2004 | Spiropoulos | |
| 2004/0188010 | A1 | 9/2004 | Chaoui | |
| 2007/0046476 | A1 | 3/2007 | Hinkamp | |
| 2008/0266118 | A1 * | 10/2008 | Pierson et al. | 340/573.6 |

FOREIGN PATENT DOCUMENTS

| | | | |
|---|---|---|---|
| GB | 2398454 | A | 8/2004 |
| JP | 2007 286213 | A | 11/2007 |
| WO | 99/19888 | A1 | 4/1999 |
| WO | 2007012031 | A2 | 1/2007 |

* cited by examiner

*Primary Examiner* — George Bugg
*Assistant Examiner* — Naomi Small

(57) ABSTRACT

A flexible wristband includes conductive silicone rubber loops and an insulating rubber portion. The conductive silicone rubber loops are formed parallel to one another, and substantially define a circumference of the wristband. The conductive silicone loops are connected through a radio frequency identification (RFID) integrated circuit package to form a loop antenna. The insulating silicone rubber portion is formed parallel to the conductive silicone rubber loops, separating the conductive silicone rubber loops and providing an insulating break in the conductive loops. The RFID integrated circuit package includes multiple terminals respectively connected to the conductive silicone rubber loops to create a loop antenna, enabling the RFID integrated circuit package to transmit data through the loop antenna.

11 Claims, 4 Drawing Sheets

VIEW FROM X

CONDUCTIVE SILICONE WRISTBAND FOR WIRELESS COMMUNICATIONS

This invention pertains to the field of wireless electronic communications, and more specifically, to a wristband having an integrated circuit and a loop antenna, formed from conductive silicone rubber.

Wireless technology and microprocessors have combined to enable the exchange and processing of information over relatively short distances. For example, Radio Frequency Identification (RFID) technology has been developed according to various standards, including International Standardization Organization (ISO) standards, as an electronic identification system used for a wide variety of services. Generally, a remote wireless device (e.g., an RFID tag) is attached to a person, a product, or the like. The remote wireless device has an integrated circuit (IC), which includes a memory for storing information (e.g., identification data) and a transponder, as well as an antenna for sending and receiving information to and from a reader. The RFID tag can discretely transmit its identification data to the reader, e.g., through broadcasting or in response to an incoming signal, to expedite an identification process.

Conventionally, RFID tags are typically made in credit card form factors or luggage label shapes. There are also versions printed on strips of plastic paper that can be wrapped around a person's wrist and used for subsequent identification, typically for purpose of accessing an event or a building. For example, RFID tag wristbands may be used for public transportation passes, entry to entertainment establishments, and corporate or government identification for entry into restricted locations.

Currently, though, RFID tag wristbands are typically flimsy, which may be acceptable for single use, tamper resistant applications, but not for robust reusable applications. The RFID tag wristbands are also susceptible to failure due to environmental conditions, such as moisture and heat. For example, an RFID tag may be included on a plastic paper wristband, and an antenna for the RFID tag may by printed, for example, in conductive ink on strips of plastic paper that can be wrapped around the wrist. However, such a configuration would not be practical for use in a water park, for example, and is likely to stop functioning within a relatively short period of time. Also, such devices are typically flimsy and not conducive to extended wear situations (e.g., apartment building admission), so the RFID tags and/or wristbands must be frequently replaced. Although more durable substrates, such as rubber, may be used for a wristband, the antenna is still separately printed on or inserted into the wristband, increasing the likelihood of failure.

Furthermore, conventional RFID wristbands tend to be unattractive and unappealing to wear, as well as uncomfortable around the wrist. This is particularly a problem when an RFID wristband is required to be worn over an extended period, such as on the job (e.g., in order to indicate the wearer's permission to be within a particular location) or throughout a lengthy limited access event. The conventional RFID wristband tends to stand out as a utilitarian ID badge, as opposed to a subtle fashion accessory. Likewise, most alternatives, such as badges on lanyards or belt clips, tend to be even more conspicuous and thus less desirable for extended use.

Accordingly, it would be desirable to provide a method and system of wirelessly communicating electronic data, such as identification data, using a device formed on or within a durable rubber wristband. It would further be desirable that such a wristband have an aesthetically appealing outward appearance.

An aspect of the invention provides a wristband, including at least one conductive silicone rubber portion substantially forming a loop around a circumference of the wristband, and at least one insulating silicone rubber portion separating the conductive silicone rubber portions. The at least one insulating silicone rubber portion creates a break between respective ends of each loop formed by the at least one conductive silicone rubber portion. A wireless communication device, including multiple terminals contacting the at least one conductive silicone rubber portion, sends and/or receives data using the at least one conductive silicone rubber portion as an antenna. The antenna may be a loop antenna, for example, and the at least one conductive silicone rubber portion may include at least one corresponding aerial forming the loop antenna.

Another aspect of the invention provides an electronic identification apparatus including a wristband having a loop antenna formed from a conductive elastomer and a wireless communication device directly contacting the conductive elastomer of the loop antenna. The wireless communication device is configured to communicate using the loop antenna.

Another aspect of the invention provides a wristband including two conductive silicone rubber loops and an insulating silicone rubber portion. The two conductive silicone rubber loops are formed parallel to one another, substantially defining a circumference of the wristband, the conductive silicone loops being connected through a radio frequency identification (RFID) integrated circuit package to form a loop antenna. The insulating silicone rubber portion is formed parallel to the conductive silicone rubber loops, the insulating silicone portion separating the conductive silicone rubber loops. The RFID integrated circuit package includes multiple terminals respectively connected to the conductive silicone rubber loops, enabling the RFID integrated circuit package to transmit data through the loop antenna. The two conductive silicone rubber loops are enhanced with at least one of color, an embossing or a decorative pattern.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 1A:
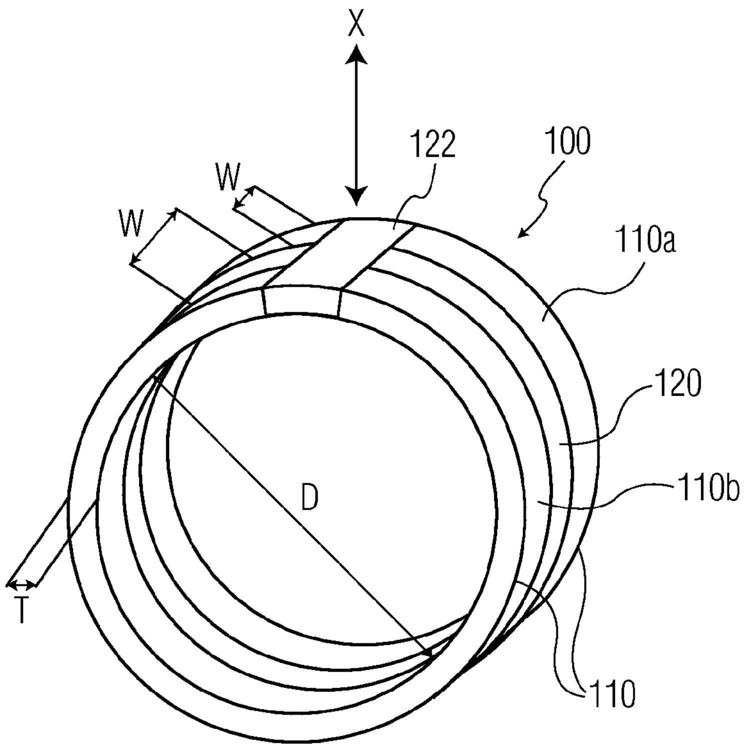
FIG. 1A is a perspective view of an exemplary embodiment of a conductive silicone rubber wristband.
Figure 1B:
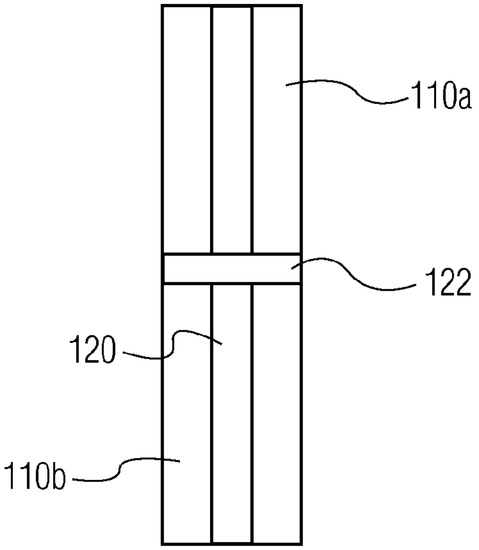
FIG. 1B is another perspective view of the exemplary embodiment of a conductive silicone rubber wristband shown in FIG. 1A.

FIG. 1A is a perspective view of an exemplary conductive silicone rubber wristband, according to an embodiment. FIG. 1B is another perspective view of the exemplary embodiment of a conductive silicone rubber wristband shown in FIG. 1A, according to an embodiment, showing the perspective as viewed from position "X."

FIG. 1A shows an exemplary wristband 100, made of a generally elastic rubber material, as discussed below. The wristband 100 is substantially circular in shape, and is appropriately sized to enable the wearer to slide the wristband 100 over the hand and onto the wrist. In other words, a diameter D of the wristband 100 is large enough and/or the silicone rubber 110, 120 flexible enough to be comfortably slipped over an average sized wearer's hand, yet small enough to prevent the wristband 100 from unintentionally falling off. The wristband 100 may come in different sizes to account for various hand and/or wrist sizes. Likewise, in an embodiment, the wristband 100 may be modified to be worn elsewhere on the wearer's body, such as the ankle.

The wristband 100 is molded from silicone rubber, including two components: conductive silicone rubber portions or strips 110*a*, 110*b*, and insulating silicone rubber portion or strip 120. The conductive strips 110*a*, 110*b* are configured as two conductive loops or aerials, which together form a loop antenna to enable wireless communications by an attached electronic device, such as an RFID tag or IC chip (not shown in FIG. 1A or 1B), as discussed below. Examples of conductive strips 110*a*, 110*b* include graphite or silver loaded silicone, although other types of conductive and/or insulating materials, generally incorporating the conductive/insulating and elastic properties of silicone rubber, may be used. For example, various other types of conductive filler may include silver/nickel, silver over hollow ceramic or glass microspheres, etc., which may be loaded into silicone or other elastomer to make the elastomer conductive.

Figure 4A:
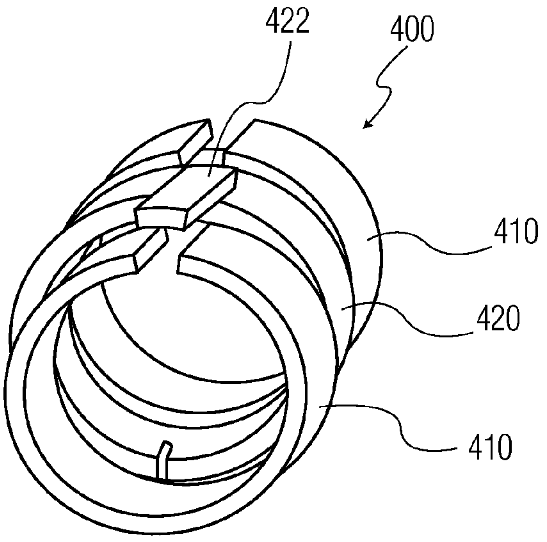
FIG. 4A is a perspective view of an exemplary embodiment of a conductive silicone rubber wristband.
Figure 4B:
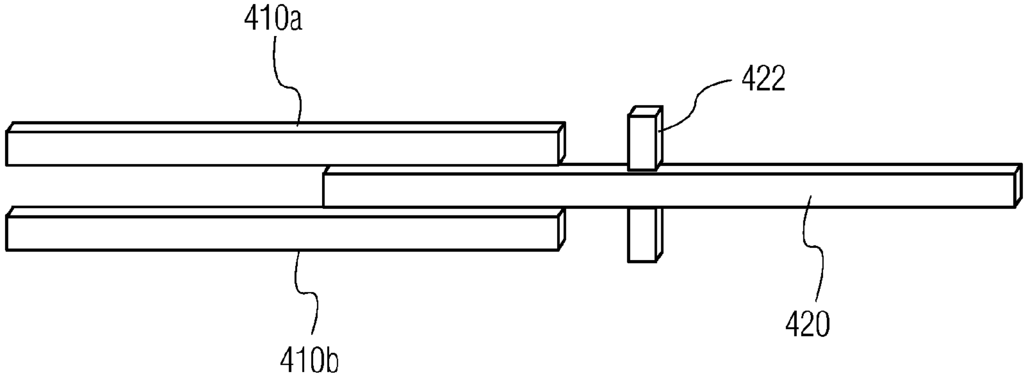
FIG. 4B is another perspective view of the exemplary embodiment of a conductive silicone rubber wristband shown in FIG. 4A.

The conductive strips 110*a*, 110*b* and the insulating strip 120 may be molded by any appropriate technique, including techniques currently known in the industry, or assembled/bonded from individual strips, as indicated in FIGS. 4A and 4B, below. Also, the conductive strips 110*a*, 110*b* and the insulating strip 120 may be decorative in order to appeal to the consumer. For example, conductive strips 110*a*, 110*b* and the insulating strip 120 may be multicolored, e.g., by being formed from dyed base materials or any other appropriate coloring technique. However, instead of (or in addition to) pigment, the conductive strips 110*a*, 110*b* are mixed or loaded with conductive materials, e.g., graphite or silver metal.

As shown in FIGS. 1A and 1B, the molding of the wristband 100 may include three strips, for example, including two conductive silicone rubber strips 110*a*, 110*b*, and insulating strip 120. It is understood that the wristband 100 may include more than two conductive strips 110*a*, 110*b* (and corresponding insulating strips 120, separating the conductive strips 110*a*, 110*b*), without departing from the spirit or scope of the present invention. For example, the number of conductive strips 110*a*, 110*b* may be adjusted to provide unique benefits for any particular situation or to meet various design requirements.

As shown in FIGS. 1A and 1B, the three strips may run generally parallel to one another, defining the circumference of the wristband 100, the two conductive strips 110*a*, 110*b* being separated by the insulating strip 120. Further, the wristband 100 is formed so that the conductive strips 110*a*, 110*b* have a break, indicated by insulating portion 122, so that each of the conductive strips 110*a*, 110*b* do not alone form continuous a loop. Rather, the conductive strips 110*a*, 110*b* may be interlinked, e.g., through an attached electronic device or IC package, to form a loop antenna circuit for an RFID integrated circuit package. The insulating portion 122 may be formed from the same material as the insulating strip 120, although different insulating materials may be used.

In an alternative embodiment, the wristband 100 may include only a single conductive strip, which forms a single loop or aerial as the circumference of the wristband 100. When there is a single conductive strip, an insulating strip (e.g., insulating strip 120), creating a parallel loop around the wristband 100 to separate multiple conductive strips, is not needed. However, the wristband 100 will still include the insulating portion 122 to insulate the two ends of the conductive strip from one another, creating the break. Other embodiments include more than two conductive strips, separated from one another by multiple insulating strips. For example, if the wristband 100 has three conductive strips (e.g., forming three loops or aerials), they are separated by two intervening insulating strips.

Figure 2A:
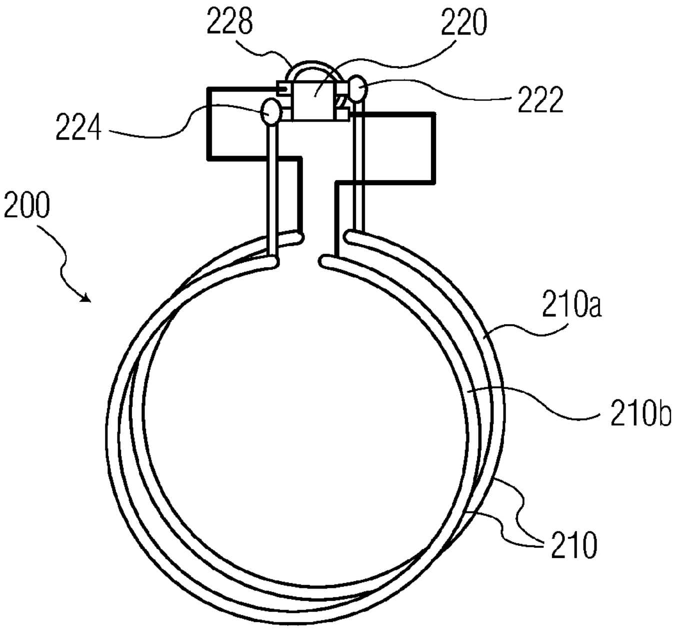
FIG. 2A is a block diagram of an exemplary embodiment of a conductive silicone rubber wristband.
Figure 2B:
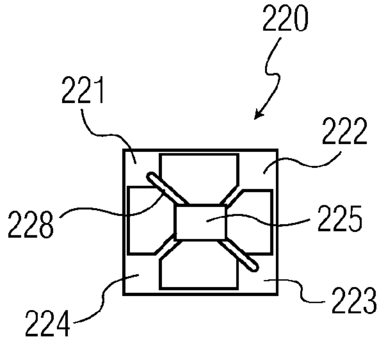
FIG. 2B is a block diagram of an exemplary embodiment of an integrated circuit (IC) package attached to the conductive silicone rubber wristband of FIG. 2A.
Figure 2C:
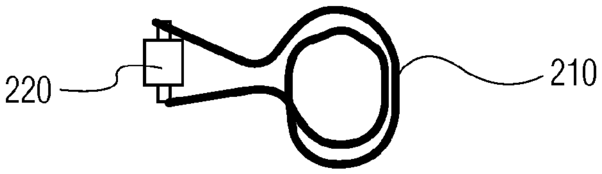
FIG. 2C is a circuit diagram of an exemplary embodiment of the conductive silicone rubber wristband of FIG. 2A.

FIG. 2A is a block diagram of an exemplary embodiment of a conductive silicone rubber wristband. FIG. 2B is a functional block diagram of an exemplary embodiment of an IC package connected to the conductive silicone rubber wristband of FIG. 2A, and FIG. 2C shows an exemplary circuit diagram corresponding to the conductive silicone rubber wristband of FIG. 2A, according to an embodiment.

FIG. 2A shows circuit 200 formed by an antenna loop 210 and an IC package 220 connected to the loop 210. The loop 210 includes a first loop (aerial) 210*a* and a second loop (aerial) 210*b*, which are connected in series through the IC package 220 to make a two-turn loop (i.e., antenna loop 210). The first and second loops 210*a* and 210*b* correspond to the conductive strips 110*a* and 110*b*, respectively, previously discussed with respect to FIG. 1A. The IC package 220 may be an RFID integrated circuit package, and is configured to connect to the first and second loops 210*a* and 210*b* to form the loop antenna. In alternative embodiments, the IC package 220 may include various other wireless communication devices capable of functioning with a loop antenna.

Referring to FIGS. 2A and 2B, the IC package 220 connects to the first loop 210*a* via connector 222 and to the second loop 210*b* via connector 224, located on a diagonally opposite corner on a substrate of the IC package 220. A cross-connection 228 links the other two corners of the IC package 220 via connectors 221 and 223. The connections result in the two-turn loop, as shown by the equivalent circuit diagram of loop 210 of FIG. 2C.

The IC package 220 also includes a two-terminal integrated circuit (IC) 225, which may be an RFID tag, for example. The IC 225 encompasses the essential drivers and protocols for the communication and identification process. For example, when the IC package 220 is an RFID device, the IC 225 includes the drivers and protocols associated with the RFID standards. The IC 225 may include, for example, a transponder or transceiver (not shown), which provides functionality for IC 225 to communicate with other wireless devices via the antenna loop 210. The other wireless devices may include, for example, receivers and readers for verifying the identity of the IC 225 (and thus the identity of the wearer), using appropriate standard protocols. For example, an RFID tag may be read by conventional RF-Tag readers, or readers ergonomically designed for wrist based tags, such as a reader cavity in an access control gate (e.g., which provides "put your hand in the hole in a wall to enter"). As stated above, the IC 225 is connected to the conductive loop 210, e.g., formed from conductive silicone rubber, which forms the radio frequency antenna, via the terminals 222 and 224 of the IC package 220.

The IC 225 normally takes its power from the energy induced in the antenna loop, although IC 225 may further include an internal battery (not shown) and additional memory. For example, an RFID tag may include a read-only, field-programmable non-volatile memory or a more versatile read-write memory. The IC 225 may also include a processor (not shown) configured to execute one or more software algorithms, in conjunction with the memory to provide the functionality of the IC package 220. The processor may include its own memory (e.g., nonvolatile memory) for storing executable software code that allows it to perform the various functions of the IC package 220, or executable code may be stored in designated memory locations within an external memory. Also, the IC 225 may include the capability to communicate with other ICs (e.g., in other wristbands), in addition to readers.

Referring again to FIG. 1A, the conductive strips 110*a,* 110*b,* which form the antenna loop 210 shown in FIGS. 2A and 2C, may be formed from conductive silicone rubber. The silicone rubber will have a relatively low resistivity, commensurate with conductive materials, such as a resistivity (ρ) of between $10^{-2}$ Ω cm, e.g., for silver loaded material, and 1 Ω cm, e.g., for carbon-loaded material. In an illustrative, non-limiting embodiment, the wristband 100 may have an overall width (W) of 1.2 cm, a thickness (T) of 0.2 cm, and an inside diameter (D) of 6.8 cm, for example. As shown in FIG. 1A, the width (W) includes the sum of each width (w) of the two conductive strips 110*a,* 110*b* and the insulating strip 120. Although each of the conductive strips 110*a,* 110*b* and insulating strip 120 is indicated as having approximately the same width, this is not necessarily the case. For example, in the example, the insulating strip 120 may have a width of 0.1 cm, in which case each of the conductive strips 110*a,* 110*b* has a width (w) of 0.55 cm. The actual widths depend, for example, on the respective conductive and insulating properties the material used. In various embodiments, these characteristics and dimensions may be adjusted to provide unique benefits for any particular situation or to meet various design requirements.

The total resistance of the two-turn antenna loop 210 may be determined by the equation R=NρL/A, where N=the number of turns of the antenna, R=resistance, L=length of the antenna loop 210 (i.e., the circumference of the wrist band), and A is the cross-sectional area of each conductive strip 110*a,* 110*b*. Using the illustrative properties identified above, the resistance for the conductive strips 110*a,* 110*b* (forming the antenna loop 210) is calculated as follows, e.g., for silver loaded material:

$$\text{From } R=N\rho L/A$$

$$R=2\rho(\pi D)/(Tw)$$

$$R=2(0.01\ \Omega\ \text{cm}(\pi(6.8\ \text{cm})))/((0.2\ \text{cm})(0.55\ \text{cm}))$$

$$R=3.9\ \Omega$$

Figure 3:
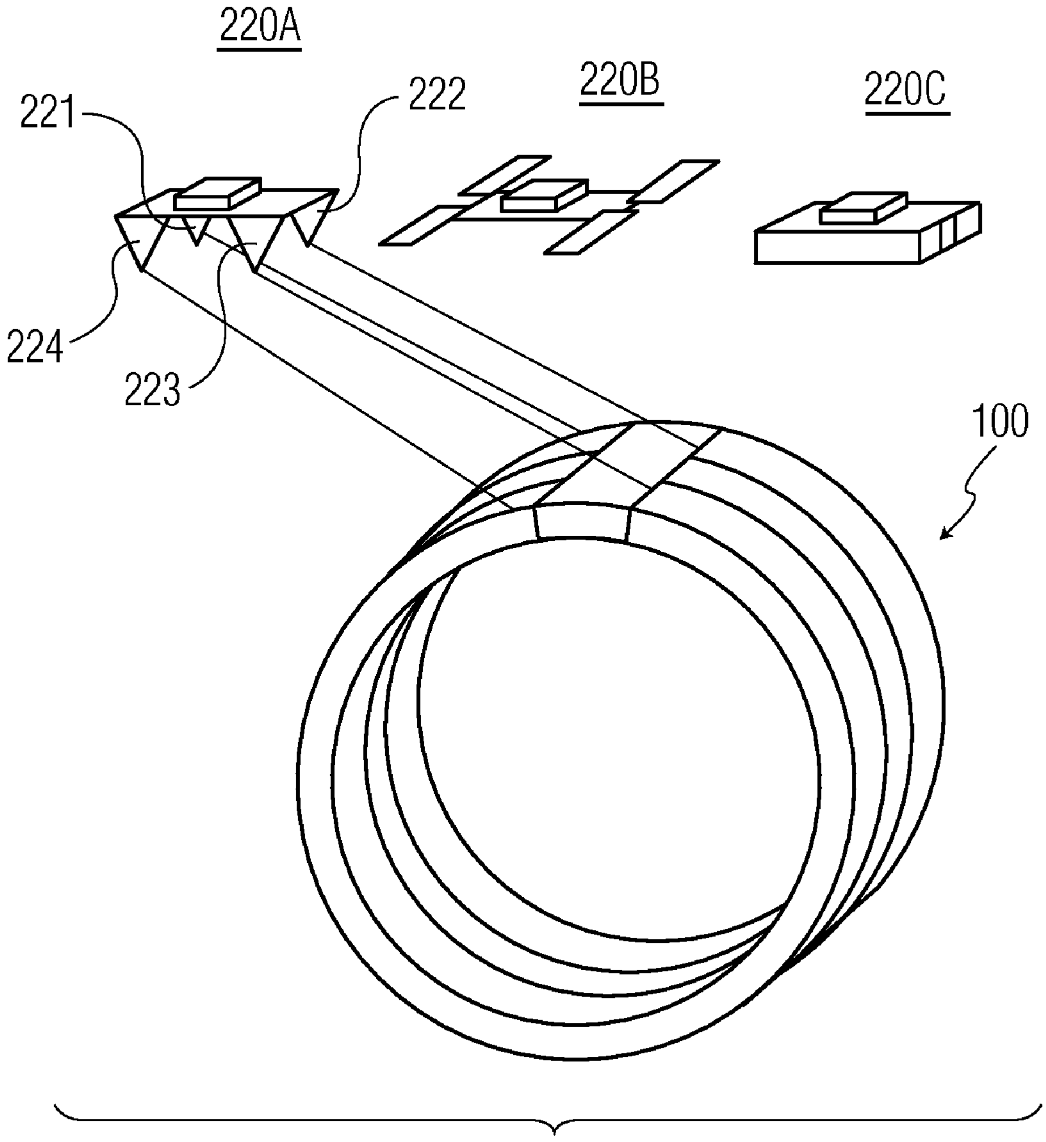
FIG. 3 is a perspective view of exemplary embodiments of a conductive silicone rubber wristband and IC packages.

FIG. 3 is a perspective view of an exemplary embodiment of a conductive silicone rubber wristband and various configurations of IC packages, according to embodiments. As previously discussed, the IC package 220 is attached to the wristband 100 in the vicinity of the break 122. The IC package 220 includes four connectors, connectors 221-224, which connect with the loops 210*a,* 210*b,* respectively, which correspond to the conductive strips 110*a,* 110*b*. The connections 221-224 enable communications by the IC 225 of the IC package 220 via the antenna loop 210, shown in FIG. 2A, for example.

FIG. 3 depicts three exemplary configurations of the IC package 220, corresponding to three methods of attaching the IC package 220 to the wristband 100 and connecting to the conductive strips 110*a,* 110*b*. The first exemplary configuration is indicated by IC package 220A, which includes four blade-like terminals corresponding to connectors 221-224. The four terminals pierce the conductive silicone rubber of the conductive strips 110*a,* 110*b,* e.g., by being pressed onto a top surface of the wristband 100. The terminals puncture the conductive strips 110*a,* 110*b* making electrical connections. An adhesive or other covering may be added as additional support to retain the IC package 220A in place on the wristband 100, as well as to provide additional protection of the package IC package 220A to enhance durability.

The second exemplary configuration is indicated by IC package 220B, which includes four wing-like terminals corresponding to connectors 221-224. The winged terminals are molded into the wristband 100 during the manufacturing process. The terminals are molded within the conductive strips 110*a,* 110*b* making electrical connections. Alternatively, the entire IC package 220B may be molded into the wristband 100 during the manufacturing process, with the terminals contacting the conductive strips 110*a,* 110*b*. Because the terminals of the IC package 220 and/or the IC package 220 are molded into the silicone rubber, they are completely encased in silicone rubber and thus very robust and durable.

The third exemplary configuration is indicated by IC package 220C, which includes four smooth endplate-like terminals corresponding to connectors 221-224. The IC package 220C may be inserted into a recess formed in the wristband 100 (e.g., mold formed during the manufacturing process or etched subsequent to mold forming) The plate terminals then press on the ends of the conductive strips 110 in the wristband 100 to make electrical contact with the conductive strips 110*a,* 110*b*. An adhesive or other covering may be layered over the exposed top portion of the inserted IC package 220C to retain the IC package 220C in place and to provide protection.

FIG. 4A is a perspective view of an exemplary conductive silicone rubber wristband, according to another embodiment. FIG. 4B is another perspective view of the exemplary embodiment of a conductive silicone rubber wristband shown in FIG. 4A, according to an embodiment.

FIG. 4A shows an exemplary wristband 400, which is similar to the wristband 100 of FIG. 1A, except that the conductive silicone strips 410*a,* 410*b* and the insulating strip 420 are not molded as a unit. Rather, the conductive silicone strips 410*a,* 410*b* and the insulating strip 420 are separately molded strips, as indicated in FIG. 4B, bonded together to form the generally circular wristband 400. The bonding may use an adhesive, for example, which may be any type of appropriate adhesive. For example, the adhesive may be a water based adhesive, such as Cilbond 65W provided by Chemical Innovations Limited. As discussed above with respect to wristband 100, the wristband 400 may include one or more conductive strips, separated by parallel insulating strips, and a break between the ends of each conductive strip, indicated by insulating portion 422. In an embodiment, the insulating strip 420 and the insulating portion 422 may be one piece. Otherwise, the characteristics and functionality of the wristband 400 are substantially the same as those of the wristband 100.

The various embodiments improve the convenience of wireless communications, particularly wireless identification, such as that provided RFID tag systems. Further, because the wristbands are formed of silicone rubber and the aerial loops for a loop antenna are integral with the silicone rubber, they may be made fashionable using any variety of colors and designs. The wristbands are also comfortable to the wearer due to the smooth surface and pliability of silicone rubber and relatively inexpensive to produce.

Further, the silicone rubber wristbands are particularly robust, especially when the IC package is molded into the silicone rubber or covered with a protective material. For example, silicone rubber wristbands are waterproof and more flexible than similar conventional devices, especially those based on printed paper/plastic strips that may be clipped around the wrist. The silicone rubber wristband described herein may be a carrier for an electronic ID tag, which is easy to use as it can be worn all the time and does not have to be carried in a pocket or bag, or attached to a lanyard, as is necessary with conventional card based tags.

The disclosed embodiments have numerous applications. RFID technology, in particular, may be used for tokens in tagging, pass-cards, and the like. Potential applications, involving access control or identification, include ticketing for public transportation (e.g., bus, train, etc.), access to entertainment and sporting events (e.g., concerts, cinemas, exhibitions, ball games, amusement parks, etc.), access to clubs (e.g., swimming pools, gymnasiums, etc.), identification (e.g., passing on contact details, access control to restricted areas, access control to office or apartment buildings, etc.), e-voting, and access to electronic equipment (e.g., computers, networks, etc.). The use of RFID technology in the various applications may include sending/receiving data used for a multitude of purposes, such as payment data indicating when appropriate payment (e.g., for a ticket or product) has been made by the wearer, previously stored monetary data from which payment may be automatically deducted, membership data indicating current membership of the wearer, security data indicating an access clearance of the wearer, etc.

While preferred embodiments are disclosed herein, many variations are possible which remain within the concept and scope of the invention. For example, as stated above, there may be more than two conductive strips, creating a loop having a much greater overall length. Further, other materials with properties similar to those of silicone rubber (e.g., flexibility, electrical conductivity, durability) may be used as the conductive strips. Such variations would become clear to one of ordinary skill in the art after inspection of the specification, drawings and claims herein. The invention therefore is not to be restricted except within the spirit and scope of the appended claims.

What is claimed is:

1. A wristband comprising:

at least one conductive silicone rubber portion substantially forming a loop around a circumference of the wristband; and at least one insulating silicone rubber portion separating the conductive silicone rubber portions, and creating a break between respective ends of each loop formed by the at least one conductive silicone rubber portion, wherein a wireless communication device, comprising a plurality of terminals contacting the at least one conductive silicone rubber portion, at least one of sends and receives data using the at least one conductive silicone rubber portion as an antenna.

2. The wristband of claim 1, wherein the antenna comprises a loop antenna, and the at least one conductive silicone rubber portion comprises at least one corresponding aerial forming the loop antenna.

3. The wristband of claim 2, wherein the wireless communication device comprises a radio frequency identification (RFID) chip.

4. The wristband of claim 2, wherein the at least one conductive silicone rubber portion comprises graphite loaded silicone.

5. The wristband of claim 2, wherein the conductive silicone rubber portion comprises silver loaded silicone.

6. The wristband of claim 1, wherein the wireless communication device is mounted to a surface of the wristband and the plurality of terminals of the wireless communication device are inserted into the at least one conductive silicone rubber portion.

7. The wristband of claim 1, wherein the wireless communication device is molded into the wristband and the plurality of terminals of the wireless communication device are molded in contact with the at least one conductive silicone rubber portion.

8. The wristband of claim 1, wherein the wristband defines a recess in a surface, the wireless communication device being insertable into the recess and the plurality of terminals of the wireless communication device being in contact with the at least one conductive silicone rubber portion within the recess.

9. The wristband of claim 2, wherein a resistivity $\rho$ of a material forming the at least one conductive silicone rubber portion is less than 1.0 Ω cm.

10. The wristband of claim 9, wherein a resistance R of a resistance of the loop antenna is provided by the formula $R=N\rho L/A$, where N is a number of turns of the loop antenna, L is a length of the at least one aerial and A is an area defined by a cross-section of the at least one conductive silicone rubber portion.

11. A wristband comprising: two conductive silicone rubber loops formed parallel to one another, substantially defining a circumference of the wristband, the conductive silicone loops being connected through a radio frequency identification (RFID) integrated circuit package to form a loop antenna; and an insulating silicone rubber portion formed parallel to the conductive silicone rubber loops, the insulating silicone portion separating the conductive silicone rubber loops, wherein the RFID integrated circuit package comprises a plurality of terminals respectively connected to the conductive silicone rubber loops, enabling the RFID integrated circuit package to transmit data through the loop antenna, and wherein the two conductive silicone rubber loops are enhanced with at least one of color, an embossing or a decorative pattern.

* * * * *